Dec. 2, 1941.  C. KNOX  2,264,385
LIQUID CONDITIONING SYSTEM
Filed April 20, 1939  3 Sheets-Sheet 3
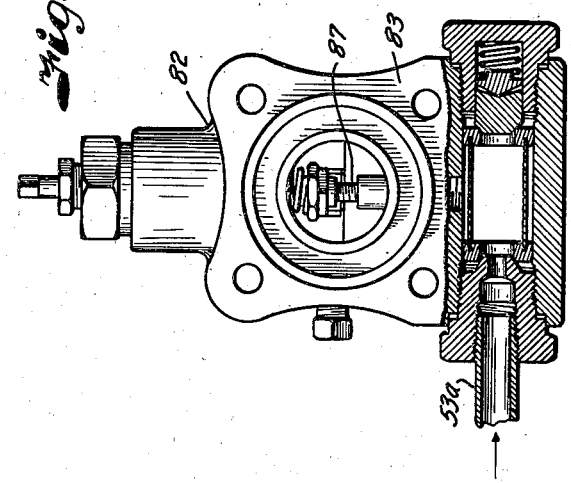
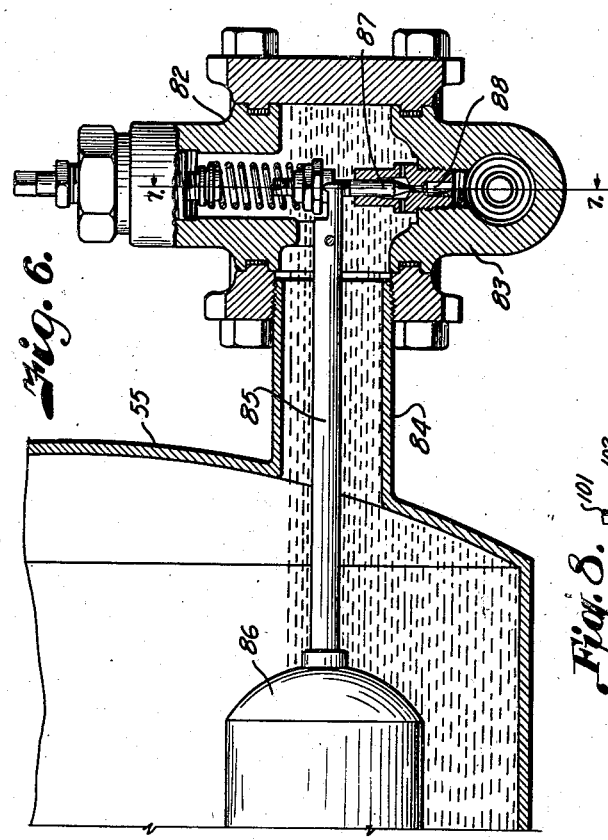
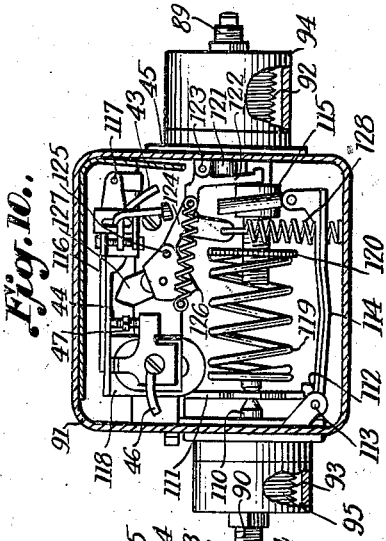
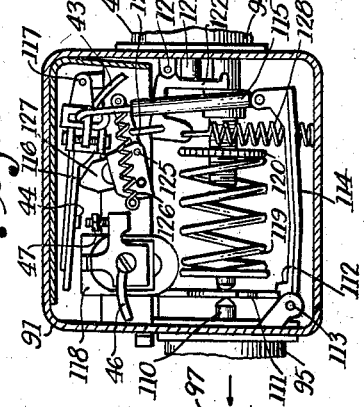
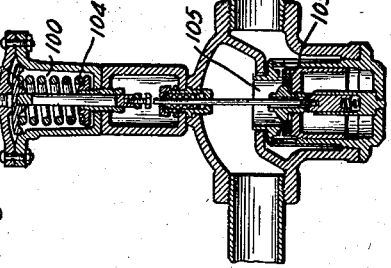
INVENTOR
*Charles Knox.*
BY
*Arthur C. Brown*
ATTORNEY Patented Dec. 2, 1941

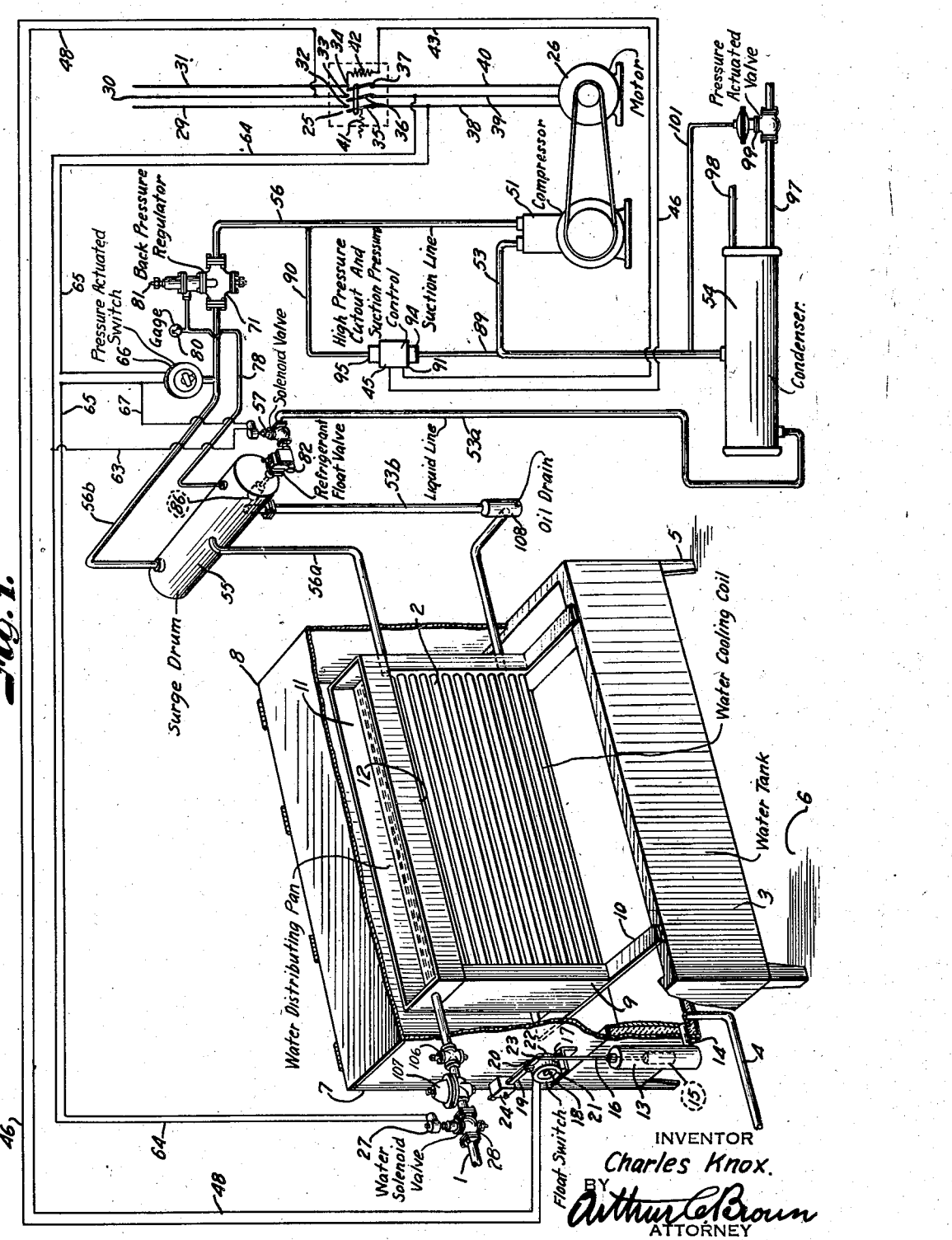

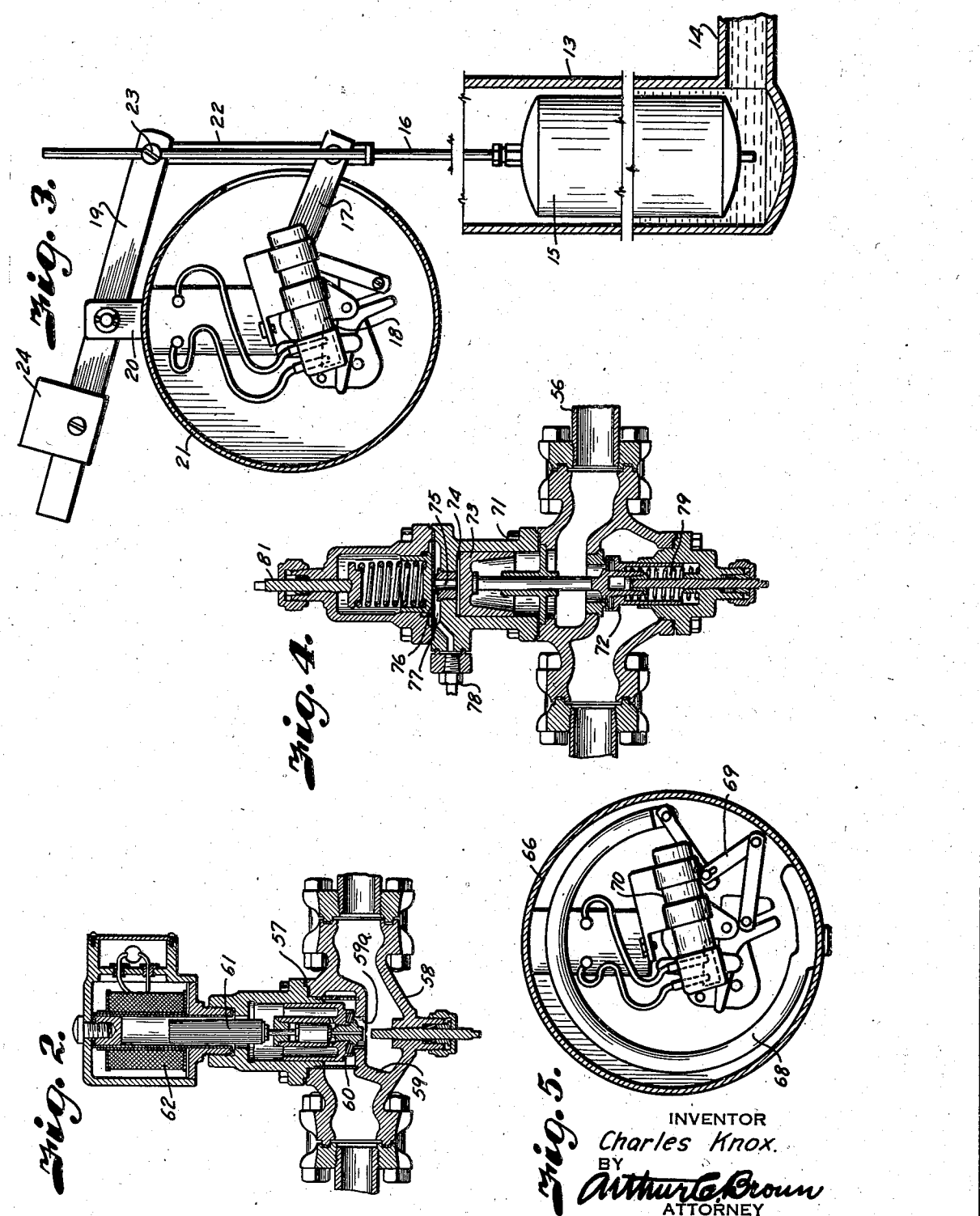

2,264,385

UNITED STATES PATENT OFFICE 2,264,385

LIQUID CONDITIONING SYSTEM

Charles Knox, Omaha, Nebr.

Application April 20, 1939, Serial No. 268,885

11 Claims. (Cl. 62—4)

This invention relates to liquid conditioning systems and more particularly to systems of this kind wherein a liquid from a given source of supply is conditioned and then held in its conditioned state as a supply to be drawn upon as desired for subsequent use.

More particularly the invention relates to a liquid cooling system for use in bottling or like plants requiring water for conditioning or other treatment and bottling or other disposition at substantially uniform low temperature and in adequate volume regardless of variations in head or temperature of the supplied water, and of variation in demand incident, for example, to interruptions in operation of bottling equipment and capacity of receiving containers.

The principal object of the invention is to provide a system of the character described wherein supply of a liquid to be cooled and of a liquid cooling medium are admitted to heat exchange relation under separate, automatic controls, both primarily responsive to variations in demand for the cooled liquid, and wherein supply of liquid to be cooled is automatically delayed until such time as the cooling medium is in a condition best suited to properly condition the liquid.

It is also an object of the invention to provide a system of this character wherein temperature of the refrigerant in the heat exchanger is held at but slightly below that of the final desired temperature of the liquid to be conditioned while the system is in operation, thereby avoiding frosting of the heat exchanger coil and securing substantially constant temperature of the cooled liquid, regardless of variation in quantity or temperature of the supplied liquid.

It is a further object of the invention to regulate supply of refrigerant automatically in proportion to the demand for the heat transfer.

It is a further object of the invention to provide automatic shut-down of the refrigerating equipment in the event of accidental discontinuance of supply of cooling liquid to the condenser.

In accomplishing these and other objects of the invention, I have provided novel electrical control and combination of controls of flow of cooling liquid and refrigerant, the preferred forms of which are illustrated in the accompanying drawings, wherein:

Fig. 1 is a flow sheet and circuit diagram illustrating a preferred form of equipment.

Fig. 2 is a detail vertical cross-sectional view of the solenoid valve for controlling the liquid supply line.

Fig. 3 is a detail vertical cross-sectional view of the float-controlled electric switch responsive to variation in level of liquid in the draw-off tank.

Fig. 4 is a detail vertical cross-sectional view of the back pressure regulator for controlling pressures in the suction line leading from the heat exchange element to the compressor.

Fig. 5 is a side elevational view of the pressure actuated switch for the solenoid valve controlling the liquid supply line.

Fig. 6 is a vertical sectional view of the float-controlled valve for controlling flow in the high pressure refrigerant line in response to variations in level of liquid refrigerant in the surge drum.

Fig. 7 is an irregular section through the surge drum float valve on the line 7—7, Fig. 6.

Fig. 8 is a vertical section through the pressure actuated valve for controlling flow of cooling liquid to and from the condenser.

Fig. 9 is an elevational view of the high and low pressure safety control for the suction and flow lines at opposite sides of the compressor.

Fig. 10 is similar to Fig. 9 with the switch of the control shown in closed position.

Referring more in detail to the drawings:—

1 designates a supply line for furnishing water to be cooled in heat exchanging flow over the coil 2 of a refrigerating apparatus of expansion type, to a tank 3, in which the water is collected for draw-off through a line 4 leading from a low point in the tank, for bottling or other use. The tank is of a capacity to supply water up to the maximum demand of the bottling or other requirements, and is provided with legs 5, whereby it may be supported above a floor 6. The tank is of non-corrosive metal for permanency and cleanliness, externally insulated against heat gain, open at the top to receive water from the coil, and provided with a cover 7 of a height to house the coil and having a lid 8 providing access to the coil and its associated parts.

The coil 2 is mounted over the tank on a suitable support, such as an open frame, including end legs 9 adapted to rest on bars 10 extending across the tank and supported by the side walls thereof, and a top 11, formed as a pan, having a perforated bottom 12 through which water fed to the pan through the line 1 is distributed evenly onto the top runs of the coil.

13 (Fig. 3) designates a float chamber connected at its bottom by pipe 14 with the tank 3 at a low point in the tank and containing a float 15 having rod connection 16 with the lever 17 of an electrical switch 18, preferably of conventional mercury type and therefore not described in detail. The float and switch mechanism is preferably balanced through adjustable connection of the rod 16 with a lever arm 19 pivotally mounted on a standard 20 on a switch housing 21, and adjustable connection of the switch lever 17 with an arm 22 on the lever 19 which also provides a guide for the float rod 16, thereby permitting operation of the switch at variable ranges of level of water in the tank 3. The lever arm 19 is preferably provided with an adjustable weight 24 to balance the float for delicate operation of the switch in response to change in level of water in the tank. The float may, if desired, be located in the tank and operated in the manner described.

The float switch 18 controls supply of liquid refrigerant and of water to be cooled to the coil 2 under control of a master switch 25, of magnetic type, in a three-phase circuit which supplies current for the motor 26 of the refrigerating apparatus, and to the solenoid 27 controlling valve 28 in the water line 1, as presently more fully described.

The three-phase circuit supplying current for the motor and to the electrical equipment in the system includes service line wires 29, 30 and 31, having contact points 32, 33 and 34 engageable by corresponding switch arms 35, 36 and 37 in conductive relation with wires 38, 39 and 40 leading to the motor. The switch 25 is adapted to be closed and to be held against tension of a spring 41 by a magnet, indicated by coil 42, in the circuit indicated by wire 43 leading from service wire 31 to contact 44 (Fig. 9) in a high pressure cut-out and suction control switch 45, presently described more in detail, a wire 46 leading from contact 47 in switch 45, mercury switch 18 and wire 48, back to service wire 30. When the high pressure cut-out and suction control switch just mentioned is closed, as it will be when the refrigerating apparatus is functioning properly, and when the float switch is closed, as it will be when water to be cooled is being drawn from the storage tank in normal quantities for its intended use, the master switch will be held closed. However, should either of said control switches be opened, as in response to an abnormal operation of the refrigerating apparatus, or an excessive accumulation of water in the storage tank in response to interruption in demand on the tank, breaking of the circuit in magnet 42 will release the master switch to automatic opening under tension of spring 41, thus stopping the motor and discontinuing operation of the refrigerating apparatus and other equipment responsive to pressure of the refrigerating medium or electrical current, as presently more particularly described.

The refrigerating apparatus employed in the system includes a compressor 51 connected, through discharge line 53, to condenser-receiver 54, through a liquid line 53a to inlet of surge drum 55, and, through the low pressure liquid line 53b, to the cooling coil 2. The upper end of the coil connects through line 56a, to the surge drum 55, and, from surge drum 55, through suction line 56b and 56, to the compressor.

Located in the high pressure refrigerant line 53a, adjacent the surge drum, is a valve 57 which, like valve 28 in the water line, is of conventional magnetically controlled (solenoid) type consisting of a body 58 (Fig. 2), provided with a diaphragm 59, having a fluid passage 59a therein controlled by a valve member 60 which is operably connected with the solenoid armature 61 mounted for vertical movement to open the passage when the coil 62 is energized, and to close the passage by gravity when the coil is deenergized.

The magnetic coil of the refrigerant valve 57 is in parallel circuit with that of the solenoid valve 28, controlling supply of water in the line 1, through wire 63 connected with wire 64 extending from the lead wire 39 through the magnetic coil of the valve 28 and back to the lead wire 38 through wire 65, through a pressure actuated switch 66, controlled by suction or low pressure in the refrigerant line 56b; the wire 65 having a branch 67 connected with the coil of the valve 57.

The pressure actuated switch 66 is preferably of conventional mercury type having a Bourdon tube 68 (Fig. 5) connected by linkage 69 with a mercury tube 70 so mounted that increase in pressure in the tube breaks the circuit and decrease in pressure makes the circuit, so that while the motor is active and the pressure in the line 56 is below a predetermined maximum, liquid is supplied from the condenser to the surge drum, and the valve 28 in the line 1 is held open to supply water over the coil to the storage tank, but when the master switch is opened in response to operation of the float switch 18, the liquid refrigerant and water supply lines are closed to prevent refrigerant supply to the coil which might result in flooding of the storage tank.

Located in the low pressure or suction line 56, between the surge drum 55 and compressor 51, is a back pressure regulator 71, including a valve 72 (Fig. 4) for regulating flow of gaseous refrigerant from the top of the surge drum to the compressor, and a piston 73 with which the valve is operatively connected; the device including a chamber 74 above the piston, communicating through a passage 75, controlled by a spring pressed diaphragm valve 76, with a chamber 77, connected, through a pilot line 78, with the top of the surge drum, so that pressure built up in the top of the surge drum, in response to evaporation of the refrigerant in the coil, will be transmitted through the pilot line 78 to the chamber 77, lift the diaphragm valve 76 against its spring pressure and act on the piston to force the valve 72 down against the pressure of a spring 79 and open the suction line to the compressor.

The regulator valve 72 is set to open at a predetermined pressure, indicated on a gauge 80 in the pilot line, by means of an adjusting screw 81, whereby the spring pressure on the diaphragm valve 76 may be varied to balance a predetermined pressure in the chamber 77.

The pressure actuated switch 66 is operable by fluid in the suction line 56b at the coil side of the pressure regulator 71 and operates to retard opening of the water supply valve 28 until the pressure in the suction line has been reduced to a predetermined degree, thus insuring delay in supply of water to the heat exchange coil until the coil has been preliminarily cooled, thereby avoiding accumulation of water in the storage reservoir at a temperature higher than that desired for use.

The solenoid magnet of valve 57 in the liquid refrigerant line 53a, being in parallel circuit with that of the valve 28 on the water supply line, insures supply of refrigerant to the surge drum and to the cooling coil whenever water is flowing over the coil, but to insure adequate and prevent excessive supply of refrigerant in the surge drum for flow to the coils during operation of the apparatus for preliminarily cooling the coil prior to opening of the line 1, I provide a float valve 82 in the liquid refrigerant line, operable at low level in the surge drum to open the line when the refrigerant in the surge drum reaches a low level, and automatically close the liquid line, regardless of solenoid valve 57, when liquid in the surge drum reaches a high level in response to accumulation of liquid refrigerant in the surge drum, as when the liquid level rises due to evaporation of the liquid in the coils. If desired, a thermostatic type liquid control valve may be used instead of the float type.

The float valve includes a body 83 (Fig. 6) having communication with the drum through a pipe 84, and a rod 85, pivotally mounted in the body and extending through the pipe to support a float 86 in the interior of the drum, whereby fall of the liquid level causes the float to lift a valve 87, opening a passage 88 connected to the line 53a, permitting flow of the refrigerant into the surge drum when the solenoid valve 57 is open as previously described; rising of the liquid level causing the valve to close the passage 88.

Connected with the liquid line 53 and suction line 56 by feeder lines 89 and 90 respectively is the safety cutout member 45, including a housing 91 (Fig. 9) having high and low pressure bellows 92 and 93 mounted in chambers 94 and 95 thereon and connected respectively with the feeder lines 89 and 90, the low pressure bellows 93 having a plunger 110 bearing against a vertically extending arm 111 of a bell crank 112 pivoted in the housing as at 113. A lateral arm 114 of the bell crank is connected by a link 115 to a switch arm 116 at a point spaced from the pivot point 117 so that pressure in the bellows causes the plunger to exert pressure on the bell crank which moves the link to pull the switch arm downwardly to engage the contact 44 thereon with the contact 47 making the circuit between the wires 43 and 46 located in the main lead wire 31 through the holding coil 42. As the pressure in the bellows 93 decreases due to operation of the compressor, a permanent magnet 118 holds the switch arm in circuit making position until the pressure of a spring 119, as adjusted by a range nut 120, overcomes the pressure in the bellows and the attraction between the magnet and the switch arm, to move the bell crank and link and lift the switch arm, thus separating contacts 44 and 47 to break the circuit through the wires 43 and 46 whereby the circuit through the holding coil is broken and the switch 25 opened automatically to stop flow of refrigerant through the coil and supply of water over the coil.

Adjustment of pressure of the spring 119 by the range nut 120 determines the differential of pressure of the fluid in the line 90 required between the making and breaking of the circuit and therefore determines the normal range of suction pressure in the refrigerant system.

Should the discharge pressure in line 53 reach a predetermined dangerous degree, the bellows 92 will move a plunger 121 against a lever 122 pivotally mounted at 123 and connected with a toggle lever 124 pivotally mounted as at 125 to the housing. The plunger 121 pivots the lever 122, which, in turn, lifts the lever 124 over center whereupon a spring 126 connecting the toggle lever 124 with a toggle lever 127 also pivoted at 125, snaps the lever 127 upwardly against the switch arm, raising said arm and breaking the circuit to stop the compressor. When the pressure is reduced, the toggle levers will be returned to normal position by a spring 128 so the switch arm will again be under control of the low pressure bellows. The circuit through the holding coil and the motor circuit will therefore be controlled by the safety cutout, so the supply of liquid to be conditioned and the fluid refrigerant may be discontinued in response to excessive high or sub-low pressure in the refrigerant system.

Circulation of water through the condenser 54 is effected through supply and return lines 97 and 98 under automatic control of a pressure actuated valve 99 in the supply line 97. Valve 99 is preferably of the direct diaphragm operated type shown in Fig. 8, including an upper chamber 100 connected through a line 101 with the compressor discharge line 53, so that when refrigerant is being forced through the line 53, high pressure in the line will move the diaphragm 102 and valve 103, connected thereto, against pressure of a spring 104, to open a passage 105 and permit flow of cooling water through the condenser. When the compressor is idle, low pressure in line 53 will permit valve 99 to close and avoid needless flow of cooling water through the condenser.

It is desirable that the supply of water to be cooled be substantially the same as the requirements of the bottling machine or other use of the cooled water, thus preventing frequent starting and stopping of the compressor and other automatic devices. Therefore, a metering valve 106 is placed in the water line between the solenoid valve 28 and the cooling coil 2. This valve is preferably of conventional hand regulating type, so that the user, knowing the requirements for cooled water, may set the valve to practically equalize the quantity of water fed to the cooler with that required for use.

A pressure reducing valve 107 in the line 1, preferably between the solenoid valve and the metering valve, insures constant pressure and flow of water at the metering valve for any setting of said valve, regardless of fluctuation in pressure in the supply line.

Other accessories, such as the conventional oil drain 108 in the liquid line between the surge drum and coil, not necessarily constituting features of the invention, but advantageous in the operation of the system, may be supplied.

Assuming the system to be assembled as described, with the water line closed, the master switch open, and with water in the reservoir or storage tank, the operation is as follows:

The operator sets the pressure reducing valve 107 for the desired water pressure and opens the metering valve 106 to the point corresponding to the known requirements for the cooled water. When the apparatus requiring cooled water is started, the cooled water in the storage tank is drawn through the pipe 4 to the point of use. The demand for water causes the level in the tank to recede, actuating float 15, closing the float switch 18 to complete circuit from the service wire 31, through magnet coil 42, wire 43, high pressure cutout and suction control switch 45, wire 46, float switch 18 and wire 48 back to the service wire 30. The magnet 42, being energized, closes the master switch to provide current for the motor. With the compressor 51 in operation, gaseous refrigerant is drawn from the surge drum and pumped into the condenser, the flow of liquid refrigerant from the condenser to the surge drum being stopped by valve 57 to prevent flooding of the system. Continued operation of the compressor reduces the pressure in the surge drum and coil and the resulting evaporation of refrigerant cools the coil.

When pressure in the surge drum has been reduced to a point where the temperature of the coil is at the desired degree, pressure actuated switch 66 closes, completing the circuit from the lead wire 39, through wires 64, solenoid valve 28, wire 65, and switch 66, to the lead wire 38 and wires 63 and 67 to solenoid valve 57. Energizing of the solenoid 27 in the water valve 28 causes opening thereof to permit water to flow over the cooling coil and to be cooled on its way to storage in the reservoir tank. Valve 57, being also opened, permits flow of liquid refrigerant to the surge drum, the refrigerant being circulated through the compressor discharge line 53, condenser 54, surge drum 55, coil 2, again through the drum on the suction side of the coil and the suction line 56 back to the compressor 51; circulation of the refrigerant continuing for cooling the required amount of water for bottling or other purposes.

When continued operation of the compressor reduces the pressure in the surge drum to a predetermined minimum the back pressure regulator 71 partially closes the suction line and retards circulation of the refrigerant, thus holding pressure and temperature of the refrigerant at a desired set condition above the point where frosting of the coil would occur. However, continued evaporation of the refrigerant tends to increase the pressure in the surge drum causing the regulator to modulate further, thus holding a constant pressure.

Since the metering valve 106 is set for a water flow which approximately fills the demand for the cooled water, the compressor should continue operation during the period in which cooled water is required. However, should the supply of conditioned water as set by the metering valve exceed the demand, and the water in the reservoir tank rise to a level at which the float valve operates to actuate the mercury switch 18 and open the circuit through the magnetic coil 42, the master switch 25 will be automatically opened to stop the compressor motor, thus interrupting flow of the refrigerant simultaneously with interruption of flow of water over the coil.

Should refrigerant be delivered to the surge drum in volume greater than necessary for cooling the water, its accumulation in liquid form in the surge drum will cause the float valve 82 to operate to close the liquid refrigerant line 53a. Accumulation of excessive pressure in the liquid line leading from the compressor, or in the condenser, will cause the high pressure cutout 45 to open the circuit through the magnetic coil 42 and permit the master switch to open, thus stopping the compressor, as well as closing the valve 28 controlling supply of water to storage over the coil and valve 57 controlling flow of refrigerant in the coil.

Should the suction pressure in line 56 fall below a normal operating condition, which could occur if the solenoid valve 28 failed to open, thus preventing supply of water over the coil, or if refrigerant supply to the coil should fail, if valve 57 should stay closed, or if the back pressure regulator should fail to open, continued operation of the compressor would result in a reduction of the suction pressure in line 56 and low pressure safety switch 45 would break the circuit to the master switch.

It is thus apparent that in operation of my improved system, supply of only conditioned water, at approximately the temperature desired, and circulation of refrigerant automatically to supply refrigerant according to the needs of the system and with safety to the apparatus, are insured.

What I claim and desire to secure by Letters Patent is:

1. An apparatus of the character described including a heat exchanger, means including a compressor for circulating a refrigerant through the heat exchanger, a storage reservoir, means for passing a liquid to be conditioned through the heat exchanger and to the storage reservoir, an electro-magnetic device controlling supply of said liquid to the heat exchanger, a motor for operating the compressor, a current supply circuit for said motor, a magnetic switch in said current supply circuit, including a solenoid, a circuit connecting the electro-magnetic device with the current supply circuit and adapted to be energized upon closure of said magnetic switch, a circuit connected with said current supply circuit including the solenoid of said magnetic switch, a switch in the last named circuit responsive to fluctuations of level of conditioned liquid in the storage reservoir for closing the magnetic switch to energize said motor for effecting actuation of the compressor, and a pressure actuated switch in said electro-magnetic device circuit responsive to pressure of said refrigerant incidental to operation of the compressor for controlling said electro-magnetic device.

2. An apparatus of the character described including a heat exchanger, means including a compressor for circulating a refrigerant through the heat exchanger, a storage reservoir, means for passing a liquid to be conditioned through the heat exchanger and to the storage reservoir, solenoid valves respectively controlling supplies of said liquid and refrigerant to the heat exchanger, a motor for operating the compressor, a current supply circuit for said motor, a magnetic switch including a solenoid in said current supply circuit, a circuit including said solenoid valves and the current supply circuit when the magnetic switch is closed, a circuit connected with said current supply circuit including the solenoid of said magnetic switch, a switch in said last named circuit responsive to fluctuations of level of conditioned liquid in the storage reservoir for effecting actuation of the compressor through said magnetic switch, and a pressure actuated switch responsive to pressure of the refrigerant and connected in the solenoid valves circuit to open said valves when the magnetic switch is closed.

3. An apparatus of the character described including a heat exchanger, means including a compressor for circulating a refrigerant through the heat exchanger, a storage reservoir, means for passing a liquid to be conditioned through the heat exchanger and to the storage reservoir, solenoid valves respectively controlling supplies of said liquid and refrigerant to the heat exchanger, a motor for operating the compressor, a current supply circuit for said motor, a magnetic switch including a solenoid in said current supply circuit, a circuit including said solenoid valves and the current supply circuit when the magnetic switch is closed, a circuit connected with said current supply circuit including the solenoid of said magnetic switch, a switch in said last named circuit responsive to fluctuations of level of conditioned liquid in the storage reservoir for effecting actuation of the compressor through said magnetic switch, a pressure actuated switch responsive to pressure of the refrigerant and connected in the solenoid valves circuit to actuate said valves when the magnetic switch is closed, and a switch responsive to suction pressures of said compressor for opening the magnetic switch independently of the conditioned liquid operable switch.

4. An apparatus of the character described including a heat exchanger having a refrigerating coil, a surge drum connected with said coil, a condenser having a refrigerant flow line connected with the surge drum, a compressor, a discharge line connecting the compressor with the condenser, a suction line connecting the surge drum with the inlet of the compressor, a storage reservoir, means for passing a liquid to be conditioned over the refrigerating coil and to the storage reservoir, a solenoid valve controlling flow of said liquid to the coil, a solenoid valve in said refrigerant flow line, a motor for operating the compressor, a current supply circuit for said motor, a magnetic switch including a solenoid in said current supply circuit, a circuit including said solenoid valves, a circuit connected with said current supply circuit including the solenoid of said magnetic switch, a switch in the last named circuit responsive to flow demand of the conditioned liquid for controlling the current supply circuit, and a pressure actuated switch responsive to pressure in said surge drum and connected in the solenoid valves circuit to actuate said valves when the magnetic switch is closed.

5. An apparatus of the character described including a heat exchanger having a refrigerating coil, a surge drum connected with said coil, a condenser having a refrigerant flow line connected with the surge drum, a compressor, a discharge line connecting the compressor with the condenser, a suction line connecting the surge drum with the inlet of the compressor, a storage reservoir, means for passing a liquid to be conditioned over the refrigerating coil and to the storage reservoir, a solenoid valve controlling flow of said liquid to the coil, a solenoid valve in said refrigerant flow line, a motor for operating the compressor, a current supply circuit for said motor, a magnetic switch in said current supply circuit, including a solenoid, a circuit including said solenoid valves, a circuit connected with said current supply including the solenoid of said magnetic switch, a switch in the last named circuit responsive to flow demand of the conditioned liquid for controlling the current supply circuit to said motor, a pressure actuated switch responsive to pressure in said surge drum and connected in the solenoid valves circuit to actuate said valves when the magnetic switch is closed, and a switch responsive to discharge pressures of said compressor for opening the magnetic switch independently of its operation by the conditioned liquid operable switch.

6. A liquid conditioning system including a heat exchanger, lines for supplying cooling medium and liquid to be conditioned to the heat exchanger, a reservoir for liquid conditioned by the heat exchanger, an electro-magnetic device controlling the liquid supply line, a circuit for said device, and separate means, one operable in response to change in level of liquid in said reservoir, the other to change in condition of said cooling medium, controlling said circuit.

7. A liquid conditioning system including a heat exchanger, lines for supplying cooling medium and liquid to be conditioned to the heat exchanger, a reservoir for liquid conditioned by the heat exchanger, an electro-magnetic device controlling the liquid supply line, a circuit for said device, a switch in said circuit operable to close in response to lowering of level of liquid in said reservoir, and a second switch in said circuit operable in response to decrease in pressure of the cooling medium in the system to close said circuit in lag relation to closure of the first named switch.

8. A liquid conditioning system including a heat exchanger, lines for supplying cooling medium and liquid to be conditioned to the heat exchanger, a reservoir for liquid conditioned by the heat exchanger, an electro-magnetic device controlling the liquid supply line, a circuit for said device, means operable in response to change in level of liquid in said reservoir to close said circuit, a switch operable in response to change in pressure of the cooling medium in the system controlling closure of said circuit, and means under control of said pressure operable switch controlling admission of cooling medium to the heat exchanger.

9. A liquid conditioning system including a cooling coil, a line for supplying liquid to be conditioned in heat exchange relation to the cooling coil, a storage reservoir for conditioned liquid, a compressor, an electric motor for operating the compressor, a circuit for said motor, cooling medium supply and return lines connecting the compressor with opposite ends of the coil, a float in said reservoir, a switch operable by said float controlling the motor circuit, a solenoid controlled valve for said liquid supply line, a circuit including the solenoid of said valve, connected with said motor circuit, and a switch in the valve circuit responsive to change in pressure in said return line, operable in lag relation to evaporation of cooling medium in the coil.

10. A liquid conditioning system including a cooling coil, a line for supplying liquid to be conditioned in heat exchange relation to the cooling coil, a storage reservoir for conditioned liquid, a compressor, an electric motor for operating the compressor, a circuit for said motor, cooling medium supply and return lines connecting the compressor with opposite ends of the coil, a float in said reservoir, a switch operable by said float controlling the motor circuit, a solenoid operable valve for said liquid supply line, a circuit including the solenoid of said valve, connected with said motor circuit, a back pressure regulator in said return line, and a switch in the valve circuit operable in response to decrease in pressure in said return line to close said valve circuit.

11. A liquid conditioning system including a cooling coil, a line for supplying liquid to be conditioned in heat exchange relation to the cooling coil, a storage reservoir for conditioned liquid, a switch operable in response to change of level of liquid in said reservoir, a surge drum connected with opposite ends of the coil, a compressor having supply and suction lines connected with said drum, a float valve controlling said supply line pursuant to change in level of liquid cooling medium in said drum, a motor for operating the compressor, a circuit for supplying current to the motor, a magnetic switch having a solenoid, a circuit including the solenoid of said magnetic switch and the switch responsive to variation in level of liquid in said reservoir, a valve in said liquid supply line including a solenoid, a circuit including the solenoid of said valve, connected with the motor circuit, a back pressure regulator in the suction line between the drum and the compressor, a switch in the liquid supply line valve circuit operable by decrease in pressure in said return line between the drum and the back pressure regulator, a valve in the supply line from the compressor to the drum, including a solenoid, and a circuit in parallel with the liquid supply line valve circuit controlling said last named valve.

CHARLES KNOX.